United States Patent Office 3,510,698
Patented May 5, 1970

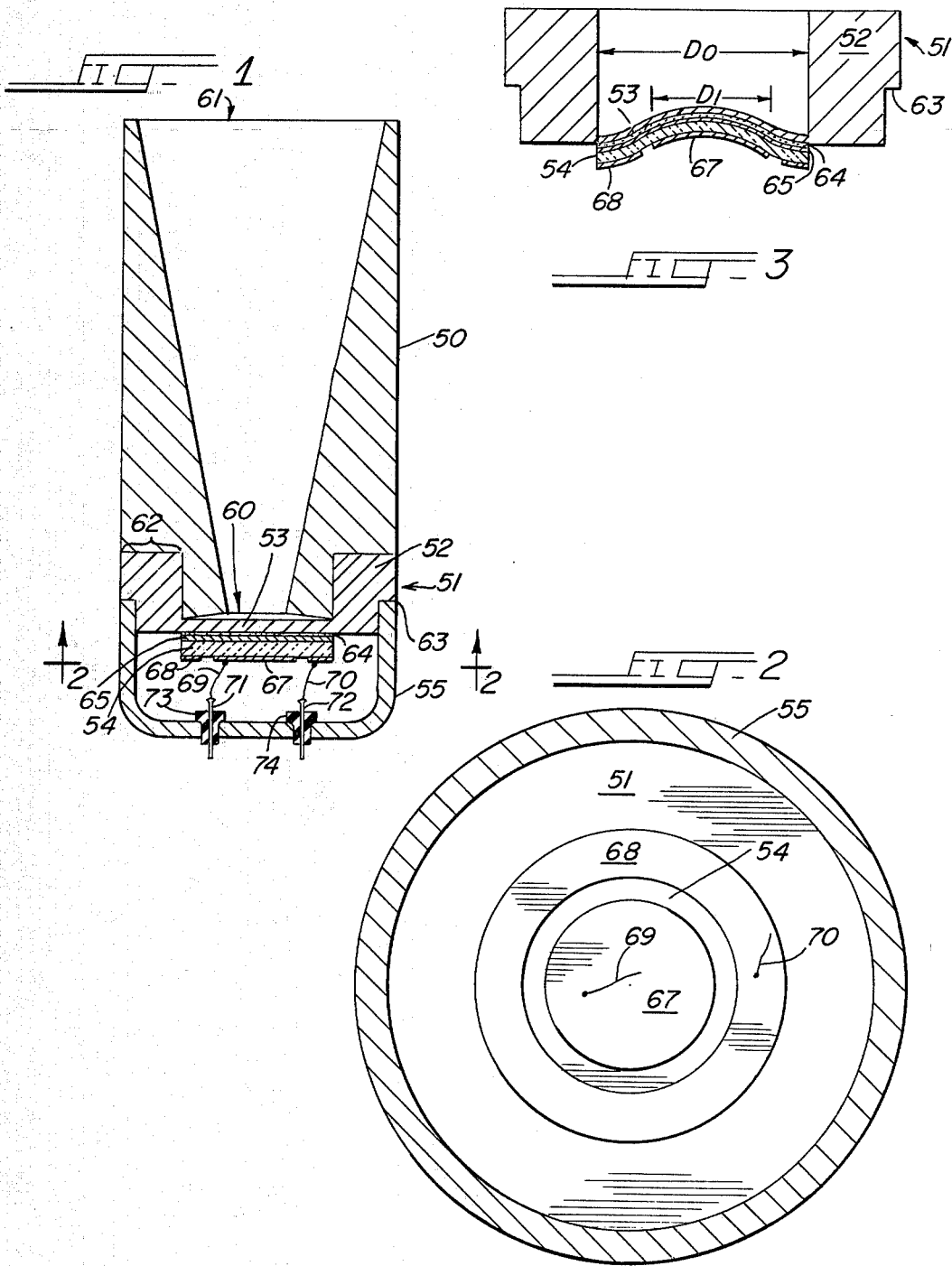

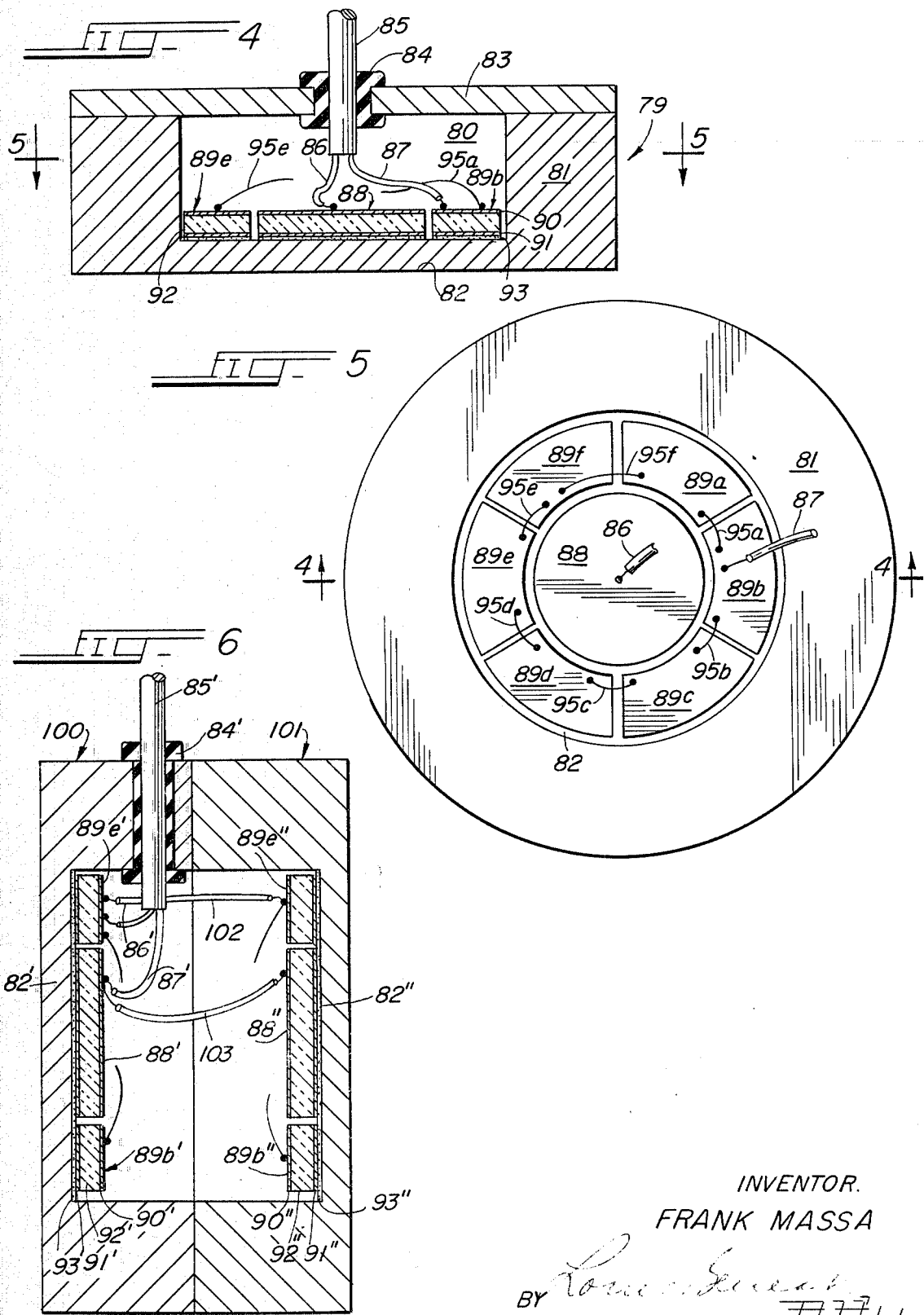

3,510,698
ELECTROACOUSTICAL TRANSDUCER
Frank Massa, Cohasset, Mass., assignor to Massa Division,
Dynamics Corporation of America, Hingham, Mass.
Filed Apr. 17, 1967, Ser. No. 631,384
Int. Cl. H01v 7/00
U.S. Cl. 310—8.5    15 Claims

ABSTRACT OF THE DISCLOSURE

A metallic cup is machined to have a massive cylindrical wall closed at one end by a thin vibratile disk. A piezoelectric ceramic transducer element is cemented to the vibratile disk. The bonded side has a continuous electrode across the face of the ceramic, and the unbonded side of the ceramic has a central electrode concentrically surrounded by an annular band electrode. When an A.C. signal is applied across the central and annular electrodes, the central part of the ceramic is compressed and the peripheral part is put in tension. This drives the vibratile disk to generate acoustical frequencies at the natural resonant frequency of the disk.

---

This invention relates to electroacoustical transducers and more particularly to transducers for operating at a frequency which is established by the natural resonant frequency of a vibratile element in the tranducer.

Electroacoustical transducers are, of course, very well known devices for converting electrical signals into sound waves or sound waves into electrical signals. The state of the transducer art has advanced rapidly with a result that the cost of these transducers is now quite reasonable relative to their costs some years ago. However, they are still fairly expensive items relative to the cost of other equipments with which they might operate. This expense has sometimes prevented a wide spread adoption of combinations using the transducers and such other equipments.

By way of example, an electroacoustical transducer could be used as an automatic proximity indicator which sends out sound waves and then detects returning echoes. Any suitable electronic equipment could process the resulting echo-caused electrical signals to ascertain the distance between the transducer and the surface reflecting the echoes. For example, when used in air, a narrow beam proximity sensor could be used for automatically focusing a camera. In such a device, the transducer cost is not measured versus the traditional cost of comparable transducers. Rather, the transducer cost is measured by the cost increment which is added to the total cost of the camera by an installation of the proximity indicator on the camera.

It should be noted that proximity indicators of the described type are not required to reproduce a wide band of sound. Nor are they required to give a sound coverage over a widely distributed area. Quite the contrary, the output of an ideal proximity indicator transducer has a very narrow band of frequencies—or even a single frequency. Moreover, the sound dispersion should be as restricted as possible, preferably in a searchlight-beam type of pattern.

In underseas operation, on the other hand, the same transducer design might desirably have a broad beam pattern. Hence, there is a need for a general purpose transducer, of the described type, to have a great versatility which is readily adaptable to a wide range of uses.

Accordingly, an object of the invention is to provide new and improved, low cost electroacoustical transducers. More specifically, an object is to provide electroacoustical transducers having a narrow band of frequencies. Here, an object is to provide transducers having a searchlight-beam type of pattern. Conversely, an object is to provide an underwater transducer which gives a broad beam response. Hence, an object is to provide a general purpose transducer design readily adapted to extend over the continuum from small, low cost, very narrow beam transducers suitable for use in the air, to large, broad beam transducers for underwater use.

A further object of the invention is to provide low cost, highly efficient electroacoustic transducers having particular efficiency at the natural frequency of the transducer's vibratile system. Here, an object is to provide transducers having an operation frequency which is fixed by the dimension of a disk-like vibratile element clamped in a cup-shaped structure. A further object is to provide a transducer design having universal applicability in that transducers which are manufactured according to such a design may be dimensioned and structured to operate at any desired frequency over an extremely wide range extending from relatively low audio frequencies to high ultrasonic frequencies.

In keeping with one aspect of this invention, these and other objects are accomplished by means of an unitary cup-shaped metallic structure. The structure is machined to have a central, flat, relatively thin vibratile disk portion terminated at its periphery by a massive wall portion. The wall acts as a clamp at the periphery of the disk-shaped portion. A thin disk of piezoelectric, ceramic material is bonded to the vibratile disk portion in order to drive it at the natural resonant frequency of the unit.

The nature of this inventive transducer may be understood best from a study of the attached drawings, in which:

FIG. 1 is a longitudinal cross-sectional view of a transducer incorporating the principles of the invention and associated with a tapered horn designed to give a searchlight-beam type of pattern;

FIG. 2 is a plan view of the free side of the piezoelectric transducer element and associated support, the view being taken along the line 2—2 of FIG. 1 and looking in the general direction of the tapered horn;

FIG. 3 is a cross-sectional view of the transducer unit, per se, showing a deflection of the piezoelectric element at the extremity of its mechanical excursion;

FIG. 4 is a cross-sectional view of another embodiment of the transducer unit;

FIG. 5 is a plan view taken along line 5—5 of FIG. 4 of the transducer unit; and FIG. 6 is a cross-sectional view of a dual unit embodiment of the invention.

The electroacoustical transducer, shown in FIG. 1, includes a tapered horn 50, a cup-like member 51 machined to have a massive cylindrical wall 52 terminating the periphery of a relatively thin vibratile, disk-like section 53, a piezoelectric transducer element 54, and a housing or shell 55 for enclosing and protecting the element 54.

The tapered horn 50 may be made from any suitable material, such as metal or plastic, for example. Furthermore, the horn may have any well known flared shape, tapering from a relatively small, diameter throat 60 to a relatively large diameter sound emitting end 61. Near its small end, the outside radius of the horn is reduced by a distance 62. This reduction provides a small neck-like section which facilitates an assembly between the horn 50 and cup 51.

The cup-like member 51 is preferably made from metal with an outside diameter which is approximately the same as the outside diameter of the horn. The massive wall 52 preferably has a radial thickness 62 matching the radial reduction in the outside dimension of the tapered horn 50. Thus, the horn 50 fits snugly into the cup 51 where it may be permanently attached by any suitable means, such as an epoxy cement. The opposite side of the cup-like member 51 is recessed in its outside diameter as shown at 63. This recess provides a seat for the housing shell 55. When so assembled, the transducer unit 54 is enclosed in a sealed compartment which is dust proof and may be made waterproof.

At ultrasonic frequencies (say 100 kHz.), the outside diameter of the cup-like member 51 may be less than one-half inch. The relatively thin vibratile disk section 53 may be less than one-quarter of an inch in diameter. At audible frequencies (say 100 Hz.), the outside diameter of cup 51 may be a foot or more.

The transducer element 54 is a piezoelectric disk consisting of a polarized ceramic material such as barium titanate or lead zirconate titante. The ceramic disk 54 is bonded to the flat surface of the vibratile disk portion 53 by any suitable means, such as a thin layer of rigid epoxy cement 64. This epoxy cement serves as an insulator between the disk 53 and the transducer element 54; however, the successful operation of the transducer does not depend upon this insulating quality.

The side of the piezoelectric element 54 which is cemented to the disk 53 has a continuous electrode surface 65. The opposite, or unbonded side of element 54 has a circular central electrode 67 surrounded by an electrically separated concentric annular electrode 68.

The spatial relationship between these electrodes 67, 68, the metallic cup member 51, and the housing 55 may be seen best in FIG. 2. The central electrode element 67 is about one-half of the diameter or 25% of the area of the diameter or area of the vibratile disk 53. The annular electrode element 68 occupies most of the remaining space on the disk 53. The electrodes 67, 68 are connected by wires 69, 70 to pins 71, 72 (FIG. 1) which extend through rubber grommets or bushings 73, 74 in the housing 55. This connection enables a completion of electrical circuits between the transducer and the outside of the transducer housing. To seal the entire unit or to make it waterproof, the mechanical connections between the grommets, pins and the housing may be either forced fit or cemented. When the unit is to be waterproof, known techniques are used to seal a waterproof cable to the outside of the housing 55.

When the transducer element is manufactured, the ceramic disk 54 is polarized with the same polarity throughout its entire area. During polarization, the electrodes 67, 68 are connected together and then this joint connection is energized from the terminal of a D.C. source. When an external D.C. source is thereafter connected to the terminals 71, 72, current flows through the ceramic in one direction from the electrode 68 to the electrode 65 and in an opposite direction from the electrode 65 to the electrode 67. These directions of current, cause a radial stress of opposite sign to be generated in the region of the ceramic over the center electrode 67 as compared to the region of the ceramic over the outer electrode 68.

During operation, the opposite phases of the alternating current generate stresses in the ceramic 54 which deform the disk 53 and cause it to vibrate back and forth. One such phase is shown in FIG. 3. When the electrical polarity reverses during the next half-cycle in the alternating current, the disk 53 is deflected downwardly with a similar motion. For the condition shown in FIG. 3, the ceramic over the electrode 67 is in compression while the ceramic over electrode 68 is put in tension. Since the transducer produced forces are inadequate to cause any effect upon the massive metal cylindrical wall 52, the thin disk 53 behaves as a clamped disk.

The natural frequency of transducer vibrations is determined by the dimensions of the ceramic disk 54 and the dimensions of the vibratile disk-like section 53. More particularly, at some dimeter $D_1$ (FIG. 3), there is a zero stress region between the areas in compression and tension. If the disk behaves as an ideal clamped disk, the diameter $D_1$, where the zero stress region appears, is about .56 of the total diameter $D_0$ of the ceramic disk 54.

The transducer element described thus far is particularly advantageous when the diameter of the piezoelectric disk does not exceed a few inches. On the other hand, it is practically impossible to obtain large piezoelectric, ceramic disks in production quantities. Even if large disks could be manufactured without cracking or breaking, it is almost impossible to obtain uniform, piezoelectric parameters if the material is too large. In contrast to these problems, there is a uniform operating characteristic when the piezoelectric elements are reduced in size and selected for uniformly matched characteristics. Still further subdivision—relative to such small sizes, may be provided to obtain even better results. Therefore, if the transducer disk is made larger with a diameter which is between several inches and a foot or more, several separate pieces of ceramic material should be combined to make a composite, mosaic assembly, as shown in FIGS. 4 and 5.

For the mosaic embodiment, the metallic cup 79 (FIG. 4) is machined to have a central well 80 forming a massive cylindrical wall 81 with a relatively thin, disk-like, vibratile element 82 across the lower end thereof (as viewed in FIG. 4). The upper end of the transducer 79 is sealed by a plate 83 which is cemented or attached by a gasket to the wall 81. A waterproof grommet or bushing 84 is inserted into a hole in the plate 83. Again, a waterproof cable assembly may be formed by cementing or molding the grommet 84 to the cable jacket 85. Inside the jacket 85 are two conductors 86, 87 for completing the electrical circuits.

As best seen in FIG. 5, a mosaic of piezoelectric elements are compositely arranged in the concentric form which is also shown in FIG. 2. Here, however, one or more completely separate ceramic pieces form the central element 88. A number of other separate pieces 89a–89f are arranged in an annular band, concentrically disposed around the central element 88. The central element 88 covers about 25% of the area of disk 82; the annular ring 89 covers the remaining 75%. Each of these separate pieces of ceramic has an upper and a lower electrode 90, 91 (FIG. 4) separately covering its entire upper and lower surfaces, respectively. All of these pieces are held in place by an epoxy cement.

The conductor 86 is soldered to the central element 88, and the conductor 87 is soldered to one of the elements 89b in the annular ring. A number of conductors 95a–95f (FIG. 5) are used to interconnect the upper electrode surfaces of the annular band of elements 89a–89f. All of the electrodes 91 on the lower surfaces of the ceramic pieces are electrically connected together by any suitable means, (not shown). Thus, all lower electrodes (both in the center and in the annular band) are electrically the same conductor even though they are physically separate pieces.

Upon reflection, it should be apparent that the embodiments of FIGS. 1 and 5 function in the same manner. Current flows through the ceramic material in opposite directions at the center and in the annular band. Therefore, an application of an alternating current across the wires 86, 87 causes stresses of the type disclosed in connection with FIG. 3. All of the vibratile disk-shaped section 82 is fully active and vibrating at the natural frequency established by the relative dimensions of the various transducer parts. However, the ceramic material is restricted in size to pieces which are small enough to flex without breaking. For example, the central element 88 could be divided into four or more pieces. The peripheral elements in the annular band could also be further subdivided.

A dual unit transducer is shown in FIG. 6, wherein the effective radiation area is increased by a simultaneous use of two of the transducer units which are shown in FIG. 4. This large surface unit is especially attractive in underwater usage. In greater detail, FIG. 6 shows two transducer units 100 and 101, each of which is essentially the same as the single transducer unit shown in FIG. 4. To help the reader orient these two figures, each of them identifies the same relative parts by the same reference numerals, except that the numerals carry a prime (') in respect to the transducer unit 100 and a double prime (") in respect to the transducer 101. The piezoelectric units are driven together in phase since the conductors 102, 103 interconnect the comparable elements in the two units so that they have the same potentials at any given instant.

From an inspection of FIG. 6, and a comparison with FIG. 4, it should be apparent that there are two diaphragm surfaces 82', 82" arranged for simultaneous vibration in the same relative phase. Thus, the total effect of these two transducer units is that of a pulsating source.

When this dual units structure is used as a low frequency radiation source (i.e. where the diameter of the vibrating surface is less than a quarter wave length of the generated sound), the double source effectively increases the radiation resistance on the surface of each vibrating piston. This increase in radiation resistance, combined with the use of two vibrating surfaces, greatly increases the power output for any given diameter.

The foregoing description and attached drawings relate to several specific embodiments of the invention. However, the invention is not necessarily limited thereto. Quite the contrary, the attached claims are to be construed broadly enough to cover all equivalents falling within the true scope and spirit of the invention.

I claim:

1. The combination in an electroacoustic transducer of a cup-shaped structural member comprising a vibratile flat disk portion of uniform thickness at the bottom of the cup and an integral massive peripheral rim-like reinforcement portion which is rigidly connected to the structural member and which surrounds and clamps the periphery of said disk portion when the center of the disk portion is set into vibration, only one side of said disk portion being exposed to a sound field, a disk of piezoelectric material, electrodes attached to the surfaces of said piezoelectric disk, rigid bonding means joining one surface of said piezoelectric disk to the other surface of said vibratile flat disk portion of said structural member, and means comprising electrical conductors connected to said electrodes for driving said piezoelectric disk to cause a change in the radial dimension of said piezoelectric disk.

2. The transducer of claim 1 and means for directing a band of frequencies outwardly from said transducer in a searchlight-beam pattern.

3. The transducer of claim 1 and a tapered horn cemented to said member, said thin disk being positioned to drive into a narrow end of said tapered horn.

4. The transducer of claim 1 wherein said piezoelectric disk is comprised of a mosaic of separate pieces of ceramic material combined into an annular band surrounding a central element.

5. The invention set forth in claim 1 wherein one of the electrodes attached to the unbonded surface of said piezoelectric disk occupies a central circular spot of a diameter approximately one-half the diameter of said flat disk portion of said structural member.

6. The invention set forth in claim 1 wherein said piezoelectric disk is a polarized ceramic.

7. The transducer of claim 1 wherein two of said cup-shaped members are connected together with the open ends of said cup-shaped members being sealed together in a waterproof union to function as a multiple unit.

8. The combination in an electroacoustic transducer of a structural member comprising a vibratile flat disk portion and a massive peripheral rim-like reinforcement portion which clamps the periphery of said disk portion when the center of the disk portion is set into vibration, only one side of said disk portion being exposed to a sound field, a disk of piezoelectric material, said piezoelectric disk being a ceramic material having at least a pair of electrodes attached to the surfaces thereof, one of said electrodes being in the center part of said piezoelectric disk and the other of said electrodes being a separate ring portion concentrically surrounding said center part, rigid bonding means joining one surface of said piezoelectric disk to the other surface of said vibratile flat disk portion of said structural member, means comprising electrical conductors connected to said electrodes for driving said piezoelectric disk to cause a change in the radial dimension of said piezoelectric disk, and means responsive to alternating current applied to at least one of said electrodes for causing alternating piezoelectric excursions which place a center section of said piezoelectric disk in compression and a peripheral section of said disk in tension during at least one phase of said alternating excursions.

9. The transducer of claim 8 wherein a zero stress region appears in said piezoelectric disk between the regions of said compression and tension, the diameter of said zero stress region being approximately equal to one-half the diameter of said thin disk.

10. The combination in an electroacoustic transducer of a structural member comprising a vibratile flat disk portion and a massive peripheral rim-like reinforcement portion which clamps the periphery of said disk portion when the center of the disk portion is set into vibration, only one side of said disk portion being exposed to a sound field, a mosais disk of polarized ceramic piezoelectric elements, electrodes attached to opposite surfaces of said piezoelectric elements, rigid bonding means joining one surface of the piezoelectric elements to the other surface of said vibratile flat disk portion of said structural member, said piezoelectric elements being arranged with a center circular portion and a separate outer concentric ring portion surrounding the center portion, said center circular portion being a separate part of said mosaic having approximately one-half the diameter of said ceramic disk, means for electrically joining the electrodes on the unbonded side of said concentric ring portion, and means comprising electrical conductors connected to said electrodes of said central portion and said concentric ring portion for driving said piezoelectric disk to cause a change in the radial dimension of said piezoelectric disk.

11. The combination in an electroacoustic transducer of a structural member comprising a vibratile flat disk portion and a massive peripheral rim-like reinforcement portion which clamps the periphery of said disk portion when the center of the disk portion is set into vibration, only one side of said disk portion being exposed to a sound field, a disk of discrete polarized ceramic piezoelectric elements, electrodes attached to opposite surfaces of said piezoelectric elements, rigid bonding means joining one surface of the piezoelectric elements to the other surface of said vibratile flat disk portion of said structural member, said piezoelectric elements being arranged with a center circular disk portion and a separate concentric ring portion surrounding the center portion, said piezoelectric disk being a multi-element ceramic mosaic composite having said center disk portion which has an area that is approximately 25% of the total area of the vibratile disk to which the piezoelectric disk is attached, means comprising electrical conductors connected to electrodes on said center portion and said concentric ring portion for driving said piezoelectric disk to cause a change in the radial dimension of said piezoelectric disk.

12. The combination in an electroacoustic transducer of a structural member comprising a vibratile flat disk portion and a massive peripheral rim-like reinforcement portion which clamps the periphery of said disk portion when the center of the disk portion is set into vibration, only one side of said disk portion being exposed to a sound field, a disk of polarized ceramic piezoelectric elements, electrodes attached to opposite surfaces of said piezoelectric elements, rigid bonding means joining one surface of the piezoelectric elements to the other surface of said vibratile flat disk of said structural member, said piezoelectric disk being a multi-element group of ceramic pieces in which one group occupies an approximately circular area equal to about 25% of the total area at the center of the vibratile disk to which the entire mosaic is assembled and a surrounding group occupies a peripheral annular band forming a second electrically connected group in which the total combined area of the annular group is approximately 75% of the total area of the vibratile disk, and means comprising electrical conductors connected to said electrodes of said central group and said annular group for driving said piezoelectric disk to cause a change in the radial dimension of said piezoelectric disk.

13. A transducer assembly comprising two transducer units, each of said units comprising a cup-like member having a massive cylindrical wall with one end open and the other end terminated and closed by a relatively thin vibratile section, thereby forming a clamped disk vibrator, a mosaic of piezoelectric ceramic elements bonded inside said cup to one side of each of said disk vibrators, the periphery of the open ends of said cylindrical walls of said two units being mutually sealed to each other to form a completely closed housing with the other sides of the disk vibrators facing outwardly on opposite sides of said closed housing, and means including a waterproof cable completing an electrical circuit from said mosaic inside said housing to terminals outside said housing.

14. A transducer unit comprising a cup-like member having a massive cylindrical wall with one end open and the other end closed and terminated by an integral relatively thin vibratile disk section, a mosaic of piezoelectric ceramic elements bonded inside said cup to one side of said disk section, a plate sealing the open end of said cylinder to completely enclose said ceramic elements in a housing, and means for completing an electrical circuit from said mosaic inside said housing to terminals outside said housing.

15. In combination in an electroacoustic transducer, a structural member comprising a vibratile flat disk portion and a peripheral rim-like reinforcement portion which serves to clamp the periphery of said disk portion when the center of the flat disk portion is set into vibration, a disk of piezoelectric material, electrodes attached to the surfaces of said piezoelectric disk, electrical conductors connected to said electrodes, said piezoelectric disk characterized in that a voltage applied to said electrical conductors causes a change in the radial dimension of said piezoelectric disk, and rigid bonding means joining one surface of said piezoelectric disk to one surface of said vibratile flat disk portion of said structural member, further characterized in that the diameter of said piezoelectric disk is approximately one-half the diameter of said flat disk portion of said structural member.

References Cited

UNITED STATES PATENTS

| | | | |
|---|---|---|---|
| 3,363,228 | 1/1968 | Massa | 340—10 |
| 3,374,367 | 3/1968 | Cowan | 310—8.5 |
| 3,432,773 | 3/1969 | Land | 310—9.6 |
| 3,252,017 | 5/1966 | Bartels | 310—9.8 |
| 3,090,939 | 5/1963 | Massa | 310—8.7 |
| 2,943,278 | 1/1960 | Mattiat | 310—8.1 |
| 2,635,199 | 4/1953 | Wolfskill | 310—9.7 |
| 2,969,512 | 1/1961 | Jaffe | 310—9.7 |
| 2,994,791 | 8/1961 | Shinada | 310—8.5 |
| 3.058,539 | 10/1962 | Adler | 310—8.3 |
| 3,142,035 | 7/1964 | Harris | 310—8.7 |
| 3,150,347 | 9/1964 | Hanish | 310—8.6 |
| 3,253,674 | 5/1966 | Desmares | 310—8.6 |
| 3,177,382 | 4/1965 | Green | 310—8.7 |
| 3,206,558 | 9/1965 | Shoot | 310—8.5 |
| 3,230,505 | 1/1966 | Parker | 310—8.7 |
| 3,271,596 | 9/1966 | Brinkerhoff | 310—8.7 |
| 3,380,019 | 4/1968 | Sims | 340—10 |
| 3,307,052 | 2/1967 | Neilson | 310—9.7 |
| 3,277,451 | 10/1966 | Parssinen | 340—10 |
| 3,357,641 | 12/1967 | Martner | 310—8.3 |
| 3,360,664 | 12/1967 | Straube | 340—10 |
| 3,360,771 | 12/1967 | Massa | 340—12 |
| 3,370,187 | 2/1968 | Straube | 340—10 |

J. D. MILLER, Primary Examiner

U.S. Cl. X.R.

340—10; 310—9.1, 9.6, 9.8